(12) United States Patent
Valentian (10) Patent No.: US 8,387,359 B2
(45) Date of Patent: Mar. 5, 2013

(54) ELECTROLYTIC IGNITER FOR ROCKET ENGINES USING MONOPROPELLANTS

(75) Inventor: Dominique Valentian, Rosny sur Seine (FR)

(73) Assignee: SNECMA, Paris (FR)

( * ) Notice: Subject to any disclaimer, the term of this patent is extended or adjusted under 35 U.S.C. 154(b) by 691 days.

(21) Appl. No.: 12/593,727

(22) PCT Filed: Mar. 28, 2008

(86) PCT No.: PCT/FR2008/050543
§ 371 (c)(1),
(2), (4) Date: Sep. 29, 2009

(87) PCT Pub. No.: WO2008/135695
PCT Pub. Date: Nov. 13, 2008

(65) Prior Publication Data
US 2010/0107601 A1   May 6, 2010

(30) Foreign Application Priority Data

Mar. 30, 2007   (FR) ...................................... 07 54173

(51) Int. Cl.
*F02C 7/264* (2006.01)
(52) U.S. Cl. ...................................... 60/39.821; 60/257
(58) Field of Classification Search ............... 60/39.281, 60/39.826, 200.1, 202, 212, 213, 257; 219/121.48, 219/121.5, 121.51, 121.52; 315/111.31
See application file for complete search history.

(56) References Cited

U.S. PATENT DOCUMENTS

| | | | | |
|---|---|---|---|---|
| 3,085,393 A | * | 4/1963 | Hamlin, Jr. | ...................... 60/211 |
| 3,518,828 A | * | 7/1970 | Jones et al. | ................ 60/39.821 |
| 3,533,233 A | * | 10/1970 | Kretschmer et al. | ........ 60/39.821 |
| 3,651,644 A | | 3/1972 | Breen et al. | |
| 3,861,137 A | | 1/1975 | Russell et al. | |
| 4,821,509 A | | 4/1989 | Burton et al. | |
| 5,425,231 A | | 6/1995 | Burton | |
| 6,084,198 A | | 7/2000 | Birx | |
| 6,469,424 B1 | * | 10/2002 | Marable | ......................... 313/120 |
| 8,122,703 B2 | * | 2/2012 | Fisher | ............................. 60/258 |
| 2004/0168442 A1 | * | 9/2004 | Schmotolocha et al. | ........ 60/776 |
| 2008/0264372 A1 | * | 10/2008 | Sisk et al. | ...................... 123/144 |

* cited by examiner

Primary Examiner — Phutthiwat Wongwian
(74) Attorney, Agent, or Firm — Preti Flaherty Beliveau & Pachios LLP (57) ABSTRACT

The electrolytic ignitor comprises an injector constituting a first electrode, a second electrode that is electrically insulated from the injector and that extends downstream beyond the injector, and a distribution channel to deliver a first mono-propellant to a first mono-propellant injector device constituted by at least one injection hole opening out in the vicinity of the second electrode, and an electrical power supply circuit adapted to raise the second electrode to a potential lying in the range 50 V to 1000 V relative to the potential of the first electrode. The electrical power dissipated by ionic conduction in the free jet of the first mono-propellant is suitable for giving rise to spontaneous decomposition of the first mono-propellant and for producing combustion gas that ensures ignition of jets of a second mono-propellant coming from a main injector situated in the vicinity of the second electrode.

26 Claims, 6 Drawing Sheets

ELECTROLYTIC IGNITER FOR ROCKET ENGINES USING MONOPROPELLANTS

FIELD OF THE INVENTION

The present invention relates to an electrolytic ignitor for a mono-propellant rocket engine, and to a mono-propellant rocket engine fitted with such an electrolytic ignitor.

PRIOR ART

Rocket engines fed with liquid propellants are generally ignited by self-ignition or by pyrotechnic ignition, or by electrical ignition using a torch.

Self-ignition makes use of self-igniting propellants such as mono-methyl hydrazine (MMH) and nitrogen peroxide ($N_2O_4$), which are well known, but which present high levels of toxicity and provide a specific impulse that is limited in practice to 330 seconds.

Some rocket engines operating on liquid oxygen and hydrocarbon are ignited by injecting a self-igniting liquid together with liquid oxygen, e.g. using an organometallic compound (as is done in the RD-180 engine from the Russian supplier NPO Energomash).

Nevertheless, self-ignition leads to an additional complication. Certain liquids that self-ignite with oxygen, such as organometallic compounds, are spontaneously combustible in air, toxic, and cause burns by contact. They therefore present safety problems.

Propellant combinations that are not self-igniting, e.g. liquid oxygen and liquid hydrogen, or liquid oxygen and hydrocarbon, are generally ignited either by a pyrotechnic charge (Vulcain and HM 7 engines), or else by a torch (Vinci engine). An electric ignitor (spark plug) is also used with certain cryogenic engines. Torch ignitors generally include an ignition spark plug. In both circumstances, the high voltage used (10 kilovolts (kV) to 20 kV) can give rise to difficulties. A torch or spark plug ignitor presents a decisive advantage over pyrotechnic ignition: the number of ignitions is practically unlimited.

A fourth solution, catalytic ignition, is used with mono-propellants that present exothermic decomposition (hydrazine, hydrogen peroxide) or with gaseous mixtures (oxygen and hydrogen). Hydrazine is a mono-propellant that decomposes catalytically and that also presents a high level of toxicity.

Recently, novel non-toxic mono-propellants have appeared: they are nitrates in solution in water with the addition of fuel. The nitrate salt may be constituted for example by hydroxylammonium nitrate (HAN), by ammonium di-nitramide (ADN), or by hydrazinium nitro-formate (HNF).

Liquid mono-propellants based on organic nitrates, such as isopropyl nitrate, have been used under conditions of spontaneous decomposition under high pressure, thus making it possible to avoid using a catalyst (the pressure in the combustion chamber being 3 megapascals (MPa) to 5 MPa). That configuration was used in particular for the single-person VTOL chair "Ludion" developed during the 1960's by SEPR. The reaction was triggered by a pyrotechnic charge. Nevertheless, that solution is restricted to a single use, or to a small number of ignitions if multiple pyrotechnic charges are used. Such a restriction is thus incompatible with applications that require a large number of successive ignitions.

Multiple ignitions are absolutely essential in certain circumstances, such as, for example:
controlling the orientation of satellites or of planetary landers;
landing with retrorockets operating in pulsed mode, using main propulsion; and
the top stage of a launcher having multiple payloads.

For applications that require multiple ignitions, it is common practice to use an electrical ignitor (spark plug, torch, . . . ) or to use self-ignition.

Nevertheless, spark plug ignition does not deliver sufficient energy to ensure the initial rise in pressure.

Torch ignition requires the use of other propellants that are in the gaseous state, given that the mono-propellant is in the liquid state. That gives rise to additional complication.

Self-ignition gives rise to similar complication in a two-propellant propulsion system (e.g. of the MMH-$N_2O_4$ type).

Nevertheless, there also exists another method that consists in rapidly heating the propellant electrolytically. One such method is described for example in French patent No. 1 598 903 relating to an electrothermal thruster and to its feed device.

Figure 3:
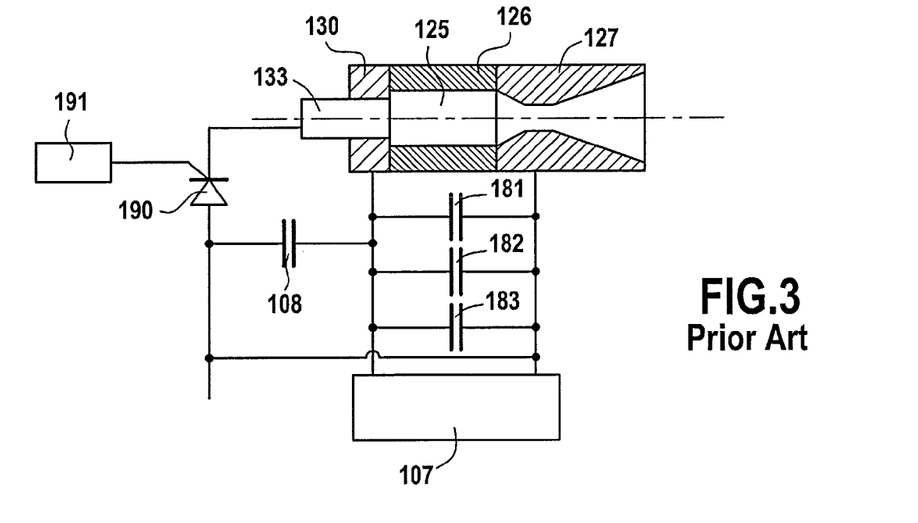
FIG. 3 is a diagrammatic view of the electric circuit of a prior art plasma thruster with electrolytic priming.

FIG. 3 is a diagrammatic schematic for the electric circuit of such an electrolytically ignited plasma thruster.

A thyristor 190, or a power transistor, under the control of a control circuit 191 enables two coaxial electrodes 133 and 130 that are immersed in a propellant to be subjected to a voltage difference (the propellant specifically being constituted by glycerin that is made conductive by adding sodium iodide). Under the effect of the voltage imposed by a capacitor 108, the Joule effect heating of the electrolytic solution leads rapidly to boiling (in less than one millisecond), and then to the formation of a plasma discharge in the channel surrounding the central electrode 133.

For a maximum current of 50 amps (A) and a voltage of 400 volts (V), the instantaneous power can reach 20 kilowatts (kW) for 10 milligrams (mg) of material.

In order to achieve enthalpy of 1 megajoule per kilogram (MJ/kg), where the propellant has already vaporized, a duration of 50 microseconds (is) suffices. That discharge in turn triggers the main discharge in an ionization chamber 125 surrounded by an insulating sheath 126 that is extended by a nozzle 127 that also constitutes the anode for the arc chamber. The instantaneous power reaches 1 megawatt (MW) and the energy (300 joules (J)) is sufficient to form a mean enthalpy of 30 MJ/kg.

A battery of main capacitors 181, 182, 183 and also the auxiliary capacitor 108 are charged by a single power supply circuit 107.

Figure 4:
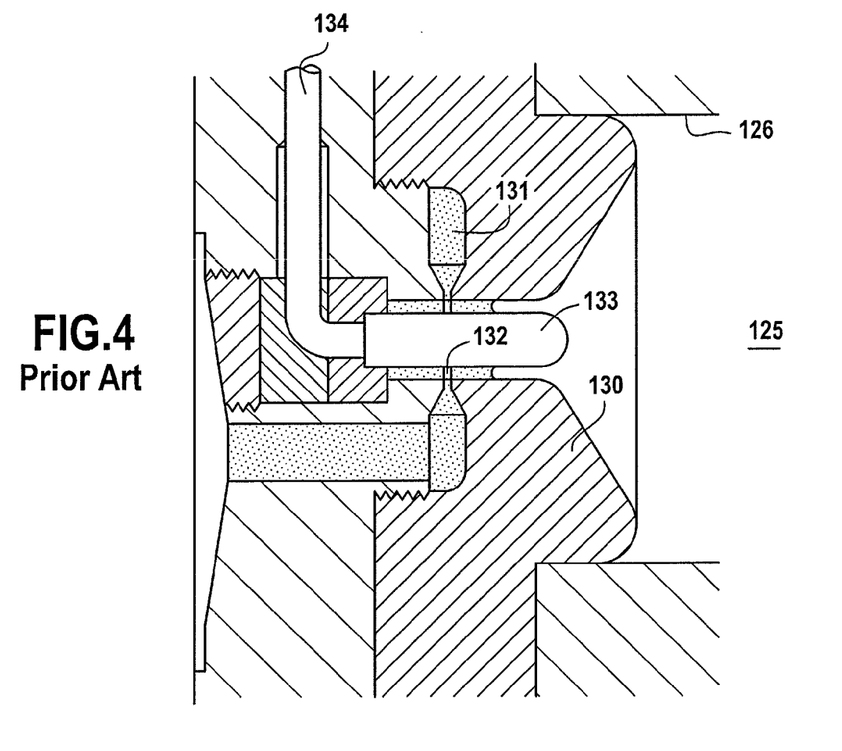
FIG. 4 is an axial section view of an example of a pre-discharge chamber in a prior art electrothermal thruster.

FIG. 4 is a detail view showing the central electrode 133 and the cathode 130 that together define an annular space 132 filled with liquid 131 by the capillary effect. The central electrode 133 is connected to a conductor 134 that is connected to the thyristor 190. The pre-discharged plasma penetrates into the discharge chamber 125.

Electrolytic ignition was also proposed in the 1970's to achieve hydrazine decomposition. U.S. Pat. No. 3,861,137 entitled "Mono-propellant electrolytic ignitor" describes a system using two porous electrodes and a ceramic felt constituting the insulation between the two electrodes. The inter-electrode voltage lies in the range 2 V to 30 V. Ignition results from the combination of heating, of ions being formed by electrolysis, and of the catalytic action of a non-conductive layer of ruthenium on the insulator. Decomposition continues on grids that are located downstream.

U.S. Pat. No. 3,651,644 entitled "Apparatus for initiating the decomposition of an exothermic propellant" describes a system of coaxial walls extending over the entire length of a combustion chamber. The mono-propellant used is mainly hydrazine. The inter-electrode voltage is of the order of 28 V.

No provision is made for enabling electrolysis to initiate a discharge. A thermal bed finishes off decomposition.

In both of those two patents, the aim is to increase the area/thickness ratio since the resistivity of hydrazine is high.

A more recent article ("Characterization and electrical ignition of ADN based liquid mono-propellants", by Anders Larsson, Niklas Wingborg, Mattias Elfberg, and Patrick Appelgren, May 2005, ISSN 1650.1942) describes an experimental device enabling electrolytic ignition to be obtained of a solution of ADN. The liquid is confined in a dielectric tube (D=9 millimeters (mm), L=25 mm). It is subjected to a voltage of 5000 V delivered by a battery of capacitors. Ignition is obtained in a few milliseconds. The high voltage is made necessary by the length/section ratio of the liquid column.

U.S. Pat. No. 6,084,198 discloses a device for triggering discharge of a magneto-plasma dynamic (MPD) propellant that uses an auxiliary electrode in association with a low pressure trigger discharge gaseous medium.

OBJECT AND BRIEF SUMMARY OF THE INVENTION

The invention seeks to remedy the above-mentioned drawbacks and in particular to enable an ignitor to be made that presents greater flexibility in use than a pyrotechnic ignitor.

In particular, the invention seeks to enable multiple ignitions to be performed as are absolutely essential at least under the following circumstances:
  a multiple-payload top stage;
  controlling the orientation of launchers or planetary landers; and
  landing with retrorockets operating in pulsed mode for a planetary mission (main propulsion using non-toxic propellants).

The invention also seeks to enable an ignitor to operate equally well in a vacuum and under pressure or at simulated altitude.

The invention also seeks to provide an ignitor of simplified construction applicable to a liquid mono-propellant rocket engine, which ignitor, in particular, does not pose particular problems of safety, and allows a combustion chamber to be ignited reliably, regardless of its size, with a very high level of instantaneous power being delivered.

In accordance with the invention, these objects are achieved by a mono-propellant rocket engine comprising a main combustion chamber, an electrolytic ignitor, and a main injector, the electrolytic ignitor comprising an injector constituting a first electrode and including a device for injecting a first liquid mono-propellant that is electrically conductive, a second electrode that is electrically insulated from the injector by an insulator, a tank for said first mono-propellant, a solenoid valve interposed between said tank and a distribution channel serving to dispense the first mono-propellant in said first mono-propellant injector device constituted by at least one injection hole opening out in the vicinity of the second electrode, and an electrical power supply circuit, the main injector being situated in the vicinity of the second electrode to inject jets of a second liquid mono-propellant into the main combustion chamber of the rocket engine, the rocket engine being characterized in that the second electrode extends downstream beyond the injector, in that the first liquid mono-propellant is injected via said injection hole in the form of a free jet that strikes the second electrode in a zone situated outside the body of the injector, and in that the electrical power supply circuit is adapted to raise the second electrode to a potential lying in the range 50 V to 1000 V relative to the potential of the first electrode, in such a manner that the dissipation of electrical power by ionic conduction in the free jet of the first mono-propellant injected via said injection hole is capable of causing temperature to rise sufficiently to lead to spontaneous decomposition of the first mono-propellant and to the production of combustion gas for ensuring ignition of the jets of the second mono-propellant coming from the main injector.

Advantageously, the dissipation of electrical power by ionic conduction in a free jet of the first mono-propellant injected via the injection hole lies in the range 100 W to 1000 W per gram per second, and is capable of causing a temperature rise of 5000° C./s to 20,000° C./s.

Advantageously, the electrical power supply circuit is adapted to raise the second electrode to a potential lying in the range 100 V to 500 V relative to the potential of the first electrode constituted by the injector.

In the invention, the first mono-propellant present in the tank is constituted by the same composition as the second mono-propellant delivered by the injector device for injecting the second mono-propellant.

The first mono-injector may advantageously comprise an aqueous solution of nitrate and a water-soluble fuel.

The aqueous solution of nitrate may comprise hydroxylammonium nitrate, ammonium di-nitramide, or hydrazinium nitro-formate.

The water-soluble fuel may comprise an alcohol or triethanolammonium nitrate.

The ignition process takes place as follows: one or more jets of electrolytic liquid (first mono-propellant) from the injector constituting a first electrode strike the second electrode situated at a potential of a few hundreds of volts relative to the potential of the injector. This gives rise to current of high density in the electrolyte constituted by the first mono-propellant, thereby heating it rapidly, and possibly also leading to an electric arc being formed.

Ignition may take place in one or more of the following manners:
  by formation of the electric arc by breakdown in the vapor stream;
  in the bulk of the liquid by an increase in temperature leading to spontaneous decomposition of the mono-propellant liquid; and
  by forming active chemical species at the electrodes.

In one possible embodiment, the second electrode is placed centrally and a plurality of injection holes for the first mono-propellant together with the outlet from the main injector are disposed around said central electrode.

In a variant embodiment, the injector device for injecting the first mono-propellant includes an annular channel.

The second electrode may be made of a refractory metal of the tungsten or tungsten/rhenium type.

The electrical power supply circuit may comprise a direct current (DC) electrical power source, at least one capacitor, and a switch such as a power transistor or a thyristor. Under such circumstances, the injector constituting the first electrode advantageously presents a potential close to electrical ground.

In a variant embodiment, the electrical power supply circuit comprises a DC power source, at least one capacitor, a chopper circuit, and a voltage-raising transformer with its primary and secondary being electrically isolated from each other, the primary being connected to the chopper circuit and the secondary being connected between the second electrode and the injector constituting the first electrode.

According to a particular characteristic of the invention, the insulator comprises a first insulator portion mounted to be able to expand freely, and a second insulator portion providing sealing between the second electrode and an insulator support.

Under such circumstances, the first insulator portion comprises at least one ceramic block made of boron nitride or of alumina.

The second insulator portion may be made of alumina and is brazed firstly to the second electrode and secondly to the insulator support.

In a variant embodiment, the second insulator portion is made of a flexible material comprising one of the following materials: PTFE, PTFCE, Vespel, and fiberglass-filled PTFE, and the second insulator portion is mounted in packing mounted on the insulator support.

In a variant embodiment, the second insulator portion is combined with a coaxial cable socket that receives a coaxial cable connector.

BRIEF DESCRIPTION OF THE DRAWINGS

Other characteristics and advantages of the invention appear from the following description of particular embodiments, given as examples and with reference to the accompanying drawings, in which.

DETAILED DESCRIPTION OF PARTICULAR EMBODIMENTS OF THE INVENTION

Figure 1:
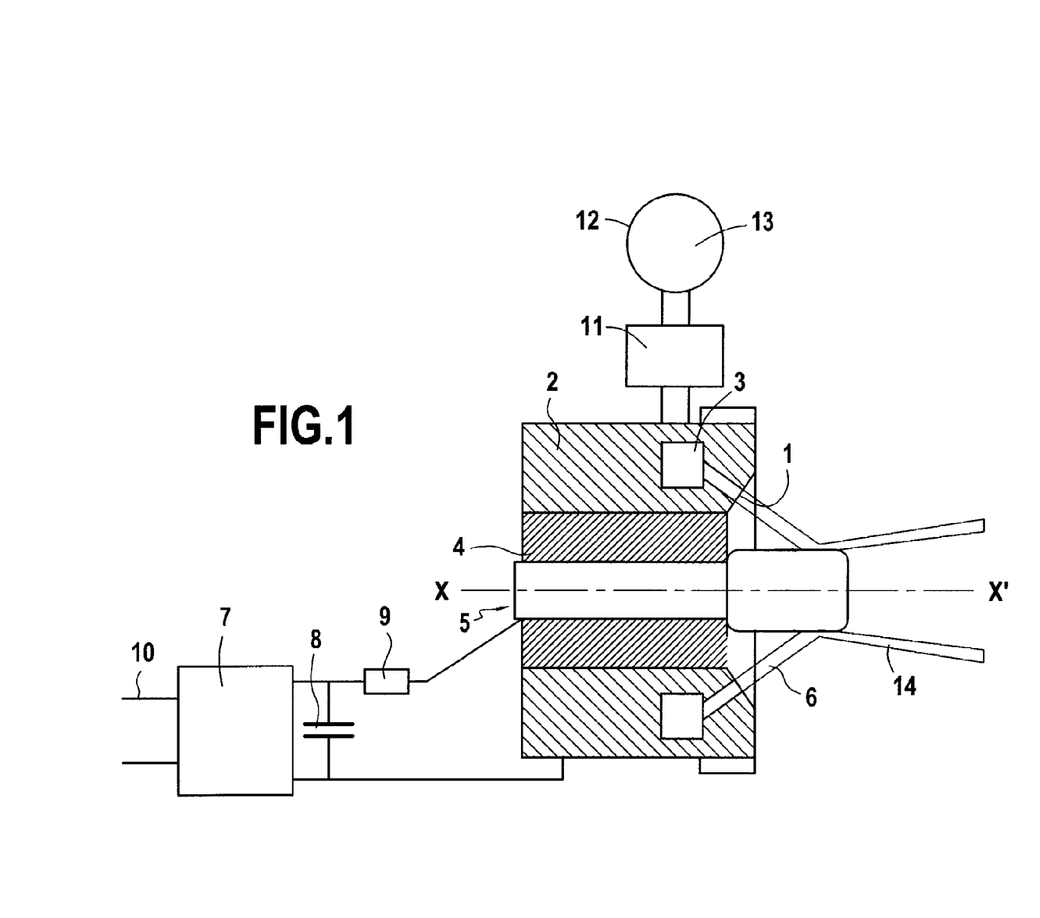
FIG. 1 is a diagrammatic axial section view of an electrolytic ignition head with a central anode in a first embodiment of the invention.

With reference to FIG. 1, there can be seen a first example of an electrolytic ignitor of the invention designed to be incorporated in a main injector that is for mounting to a combustion chamber of a mono-propellant rocket engine.

The electrolytic ignitor comprises an injector 2 that, in the example described, presents a potential close to electrical ground and constitutes a cathode.

The injector 2 comprises an electrolytic injector device with an electrolyte distribution channel 3 associated with at least one injection hole 1, or preferably with a plurality of injection holes 1 enabling free jets to be projected towards a central electrode 5 that is electrically insulated from the body of the injector 2 by an insulator 4.

In the example described, the central electrode 5 forms an anode and extends axially downstream beyond the injector 2.

Figure 6:
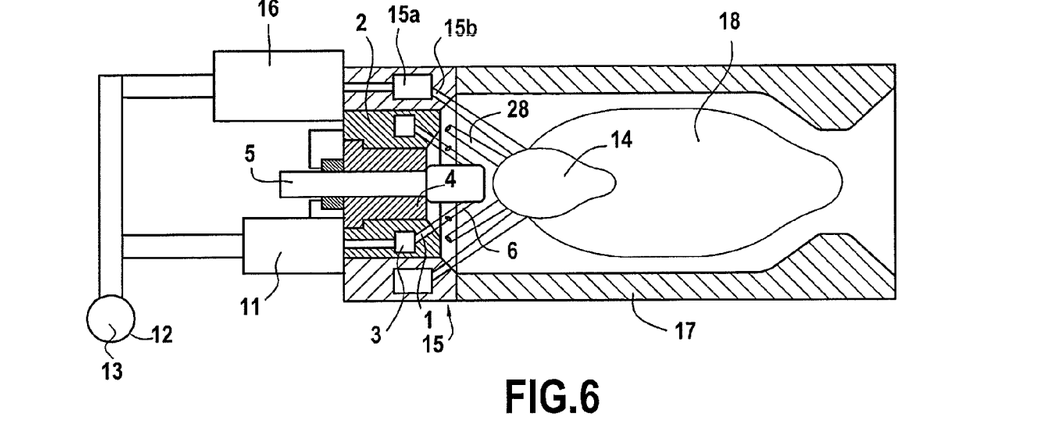
FIG. 6 is a diagrammatic axial section view showing an ignition head of the invention incorporated in a main injector and a combustion chamber.

The electrolyte distributor 3 is fed via a solenoid valve 11 from a tank 12 containing an electrolyte 13 that is advantageously constituted by a composition different from the mono-propellant delivered by the injector device 15 of the main injector (see FIG. 6).

Figure 2:
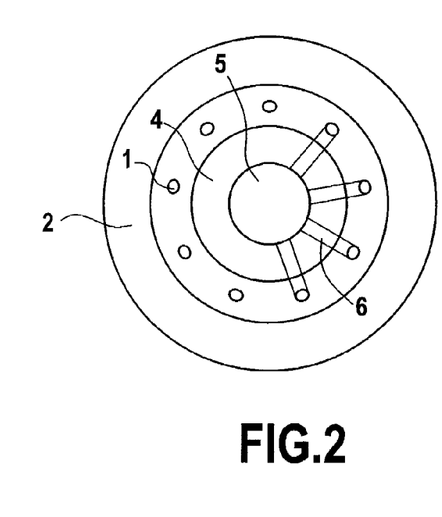
FIG. 2 is an end view of the electrolytic ignition head of FIG. 1.

In the embodiment of FIGS. 1 and 2, the electrolyte injection holes 1 are distributed in a ring around the axis XX'.

Figure 5:
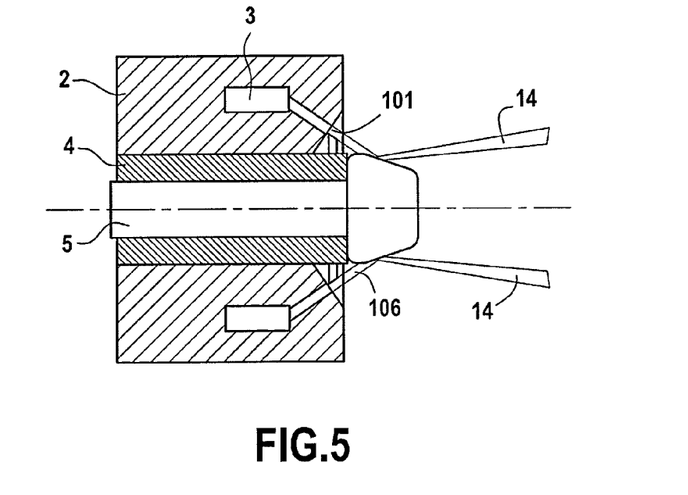
FIG. 5 is a diagrammatic axial section view of an electrolytic ignition head with annular injection, in a second embodiment of the invention.

In a variant, as shown in FIG. 5, the electrolytic mono-propellant injector device may have an annular channel that produces a conical sheet 106 that possibly enables a higher flow rate to be obtained.

In the example of FIG. 1, an electrical power supply circuit is shown diagrammatically having a DC power source 7 taken from a busbar 10. The negative pole of the power source 7 is connected to the injector body 2, which thus constitutes a cathode. The positive pole of the power source 7 is connected via a switch 9 to the anode-forming central electrode 5.

A capacitor 8 is connected in parallel with the output of the power source 7 so as to enable a potential of a few hundred volts to be applied to the electrode 5. Discharging the capacitor 8 makes it possible to obtain a very high instantaneous level of power. By way of example, the switch 9 may be constituted by a power transistor or by a thyristor.

The solenoid valve 11 controls the injection of electrolyte jets. When this valve 11 is open, the electrolyte jets 6 (FIG. 1) or 106 (FIG. 5) coming from the injection holes 1 or from the annular channel 101 put the anode-forming central electrode 5 into contact with the cathode-forming body of the injector 2.

The heating due to the electrolytic current entrains the formation of an electric discharge that, on the basis of the jets 6 heated by electrolysis or of the conical sheet 106 being heated by electrolysis, produces ignited jets 14.

FIG. 2 shows an injector 2 that, by way of example, has nine electrolyte injection holes 1. The number of injection holes is selected as a function of the flow rate to be delivered.

The left-hand portion of FIG. 2 shows the injector prior to an ignition sequence, and the right-hand portion of FIG. 2 shows the injector in operation with electrolyte jets.

It is important to observe that the electrolyte jets 6 coming from the injection holes 1 are situated downstream from the injector 2 that produces the gas mixture for ignition and they strike the electrode 5 in a zone that is situated outside the body of the injector 2.

The high current density in the electrolyte, the rapid heating of the electrolyte, and the possible formation of an electric arc thus take place within the torch downstream from the injector 2 and not inside the injector.

Unlike prior art devices, electrolysis takes place in the free jet and not in a confined space between two electrodes.

The electrical power supply at a relatively high voltage, lying in the range 50 V to 1000 V, or preferably in the range 100 V to 500 V, serves to avoid any breakdown in the vapor after the liquid has heated. Nevertheless, the voltage level remains low enough to avoid problems of electrical insulation.

The electrolytic liquid 13 is constituted by a non-toxic mono-propellant based on nitrates and comprising an aqueous solution of nitrate (such as for example hydroxyl ammonium nitrate (HAN), ammonium di-nitramide (ADN), or hydrazinium nitro-formate (HNF)), with the addition of a water-soluble fuel such as an alcohol or triethanolammonium nitrate (TERN).

Ignition of self-decomposition of a nitrate mono-propellant in ionic solution can be obtained by electrolytic heating.

Aqueous solutions of nitrates present high ionic conductivity "C" that increases with temperature T (see the document: "New nitrogen-based mono-propellants (HAN, ADN, HNF), physical chemistry of concentrated ionic aqueous solutions", by C. Kappenstein, N. Pillet, and A. Melchior).

This conductivity reaches 0.05 per ohm centimeter $(\Omega \cdot cm)^{-1}$ at $-12°$ C. and 70% concentration, and 0.2 $(\Omega \cdot cm)^{-}1$ at $+40°$ C. It follows a relationship of the following type:

$$ln(C)=1/(T\text{-}To)$$

The disposition with free jets 6 in accordance with the invention presents high resistance and makes it possible to operate at high voltage, of the order of several hundreds of volts. The heating takes place outside the injector. If the jet ignites before reaching the central electrode 5, the gas can expand freely in the combustion chamber.

When a film of vapor is produced on the central electrode 5 (the hottest part of the jet), current flow is interrupted and all of the voltage appears across the film. Since the product of pressure multiplied by distance is below the Paschen minimum, breakdown occurs and the spark ignites the remainder of the heated mixture.

The heating may give rise to selective evaporation (distillation) of the most volatile species, e.g. an alcohol. Alcohol vapor mixed with air facilitates ignition.

The example below gives an order of magnitude for the physical parameters of the discharge when using a multiple-jet injector:

Individual jet:
Diameter 1 mm
Length: 5 mm
Speed: 3 meters per second (m/s)
Mass flow rate: 3.3 grams per second (g/s)
Voltage: Vo=500 V The temperature of the propellant is 298 K at the outlet from the injector.

The initial dissipated power is 600 watts (W) (resistance=410 ohms ($\Omega$)).

After 2 milliseconds (ms), the temperature profile of the jet begins to stabilize, with the downstream portion of the jet reaching 398 K (125° C.)

The dissipated power reaches 1560 W and the resistance of the jet is 160$\Omega$.

For an ignitor head having five orifices, the following figures apply:

Initial power: 3000 W
Power at 2 ms 7800 W
Flow rate 16.5 g/s

By way of comparison, the thermal power delivered by exothermic decomposition of the mono-propellant at a flow rate of 16.5 g/s is greater than 50 kW.

The electrical power is supplied by the capacitor 8 which is capable of storing at least twice the energy that is dissipated in the discharge.

The electrolytic current reaches 15.6 A and this can be controlled by a switch 9 constituted by a power transistor.

The capacitor 8 is charged—preferably at constant current—via a voltage-raising DC/DC converter 7 connected to the busbar 10 of the satellite or missile having the rocket engine fitted with the electrolytic ignitor mounted thereon.

Injection of the mono-propellant is controlled by the solenoid valve 11, with voltage being applied simultaneously (no current will flow for about 5 ms to 10 ms, the response time of the valve).

Once ignition is obtained, the flow of current may be interrupted by closing the switch 9 constituted by a power transistor or a thyristor.

Interrupting the current causes the valve 11 to close and thus interrupts the liquid jet.

In a variant, the energy may be stored in a rapid-discharge storage battery.

In the invention, since ignition takes place in a liquid, it is relatively insensitive to pressure: the ignitor can operate equally well in a vacuum (boiling of the liquid is not immediate) and under pressure (atmospheric pressure at several megapascals (MPa)). It can also operate at simulated altitude (a few hundreds of pascals (Pa)).

In contrast, electric spark plug ignitors can be disturbed by an operating pressure that is not the vacuum of space or atmospheric pressure.

Operation at simulated altitude or in the upper atmosphere can lead to problems of insulation in the power supply and the cabling since the operating voltage is very high (10 kV to 20 kV).

Operation under high pressure becomes difficult: the insulating capability of the gas increases, thereby making ignition more complicated.

The electrolytic ignitor uses a modest voltage, of the order of 500 V, thereby simplifying problems of insulation, in particular in the pressure range corresponding to operating at simulated altitude.

Figure 11:
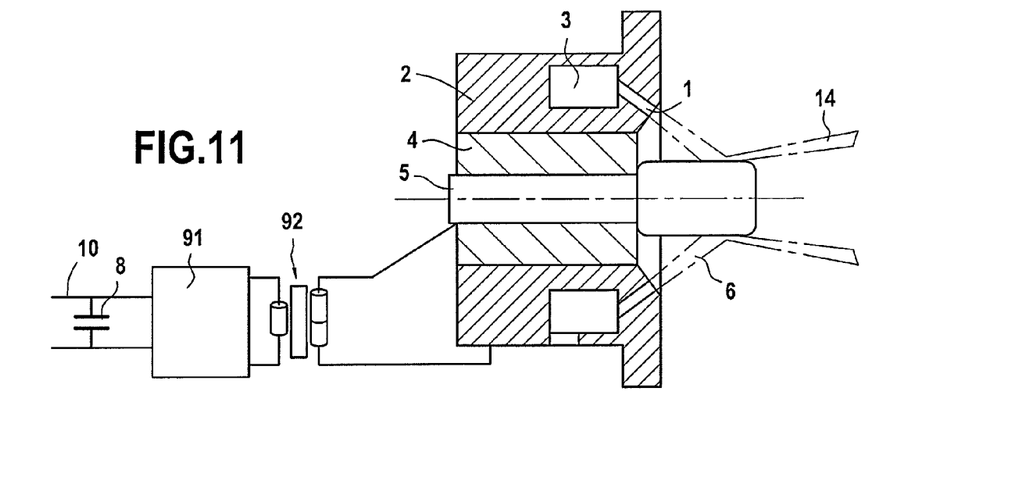
FIG. 11 is a diagrammatic view of an electrolytic ignition head of the invention with an electrical power supply circuit that incorporates a voltage-raising transformer.

In FIG. 11, there can be seen a variant embodiment in which electrolysis is performed using alternating current.

Starting from a DC source such as the busbar 10 of the satellite or missile on which the rocket engine fitted with the electrolytic ignitor is placed, energy is stored in supercapacitors 8 or in a storage battery for powering a chopper circuit 91 constituted by power transistor (e.g. insulated-gate bipolar transistors (IGBTs)) capable of controlling a current of 100 A or more at a frequency lying in the range 10 kilohertz (kHz) to 100 kHz, and a voltage-raising transformer 92, preferably a ferrite transformer, having its secondary directly powering the electrolytic ignitor between the first electrode constituted by the body of the injector 2 and the second electrode constituted by the electrode 5.

Since the transformer 92 and the transistors of the circuit 91 operate for a short period only (a few tens of milliseconds), there is no need to provide a large amount of cooling.

An electrolytic ignitor having a central electrode 5 is described above with reference to FIGS. 1, 2, and 11.

The dissipation of electrical power by ionic conduction in the electrolyte jets causes temperature to rise sufficiently to give rise to electrical breakdown in the electrolyte and to its spontaneous decomposition if the electrolyte is a mono-propellant, such that ignited jets are created at the outlet from the main injector 15 (FIG. 6) surrounding the electrolytic ignitor.

In FIG. 6, the electrolytic ignitor with its injector 2 and its central electrode 5 can be seen incorporated in the main injector 15 that essentially comprises a mono-propellant injector device comprising a dispenser 15a and injector channels 15b distributed in a ring and opening out into the combustion chamber 17 around the central electrode 5 and the holes 1 for injecting the electrolytic ignitor.

The electrolytic ignitor is thus incorporated in the main injector 15 of the combustion chamber 17 of the rocket engine and lies on the axis thereof. In FIG. 6, there can be seen the electrically-conductive jets 6 of mono-propellant coming from the injection holes 1 and striking the central anode 5, the zone 14 containing combustion gas for ignition, and the jets 28 of mono-propellant coming from the channels 15b of the main injector 15 and penetrating into the zone 14 for the combustion gas that is to be ignited so as to be ignited in turn, thereby creating a main flame 18. The wall of the combustion wall 17 may be of the ablative type.

The dispenser 15a is fed via a main valve 16, which may be pneumatic, electro-pneumatic, or electro-hydraulic (being controlled by the mono-propellant under pressure), while the dispenser 3 is fed from a solenoid valve 11.

FIGS. 7 to 10 show particular embodiments of the insulator interposed between the central electrode 5 forming the second electrode and the body of the injector 2 forming the first electrode. As in FIGS. 1, 2, 5, 6, and 11, for reasons of simplification, FIGS. 7 to 10 do not show the main injector 15.

Likewise, FIGS. 7 to 10 do not show all of the electrical power supply circuits, which may be analogous to the circuits described with reference to FIGS. 1 and 11, nor does it show the elements associated with the electrolytic liquid dispenser 3 such as the solenoid valve 11 or the tank 12.

Figure 7:
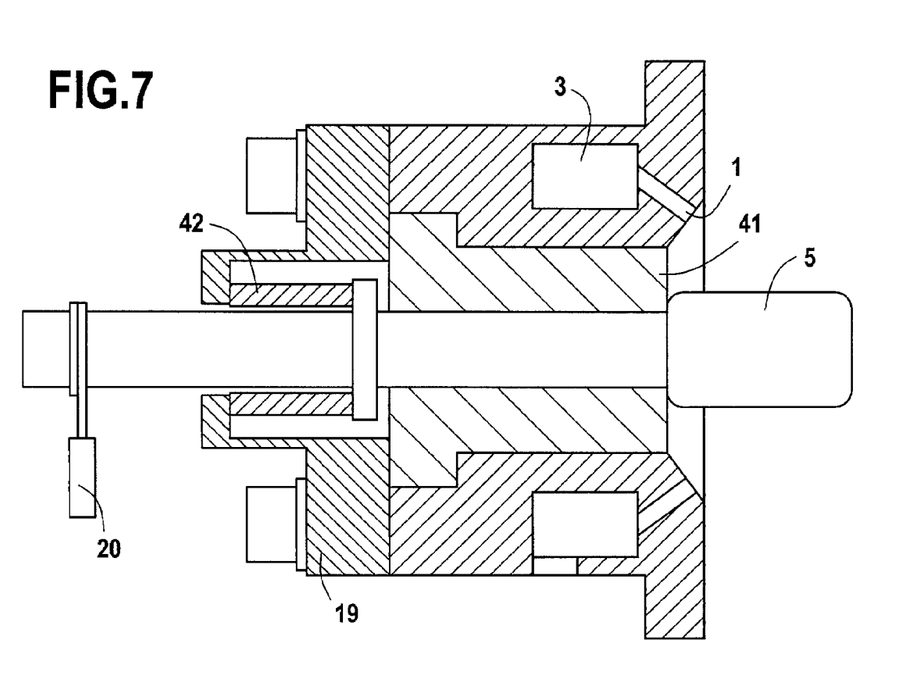
FIG. 7 is a diagrammatic axial section view of a variant embodiment of an electrolytic ignition head of the invention with a two-part insulator.

FIG. 7 shows an electrical insulator made up of two portions. The downstream portion 41 situated facing the combustion chamber is a block of ceramic mounted with clearance so as to be free to expand. The upstream portion 42 provides sealing. It is brazed to the insulator support 19 and to the central electrode 5. The configuration enables the insulator 41, 42 to be subjected to compression (starting from an end effect and the pressure of combustion).

The downstream portion 41 may be made of boron nitride or of alumina, while the upstream portion 42 may be made of alumina.

In FIG. 7, reference 20 designates an electrical connection.

Figure 8:
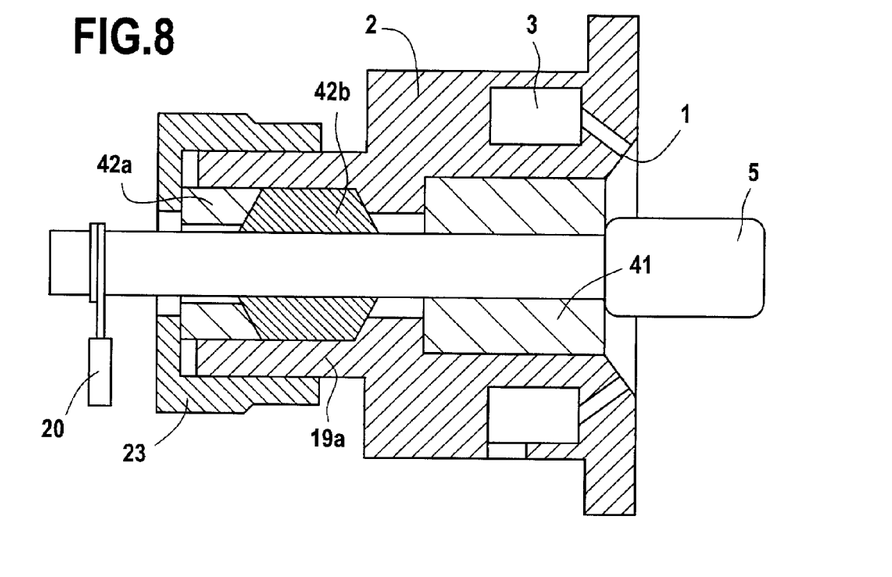
FIG. 8 is a diagrammatic axial section view of a variant embodiment of an electrolytic ignition head of the invention with an insulator associated with packing.

FIG. 8 shows an electrical insulator with packing.

The downstream portion 41 of the electrical insulator provides a fire-break wall and may be made in manner analogous to the downstream portion 41 of the FIG. 7 embodiment.

The central electrode 5 is sealed and held by packing made up of a flexible insulator 42b situated close to the downstream portion 41, an insulating thrust washer 42a, and a nut 23 that is tightened onto the rear portion 19a of the injector 2.

The flexible insulator 42b may be made of polytetrafluoroethylene (PTFE), polytrifluoro chloroethylene (PTFCE), or PTFE filled with fibers of glass or analogous material, such as for example the product sold by the supplier DuPont under the name Vespel®.

Figure 9:
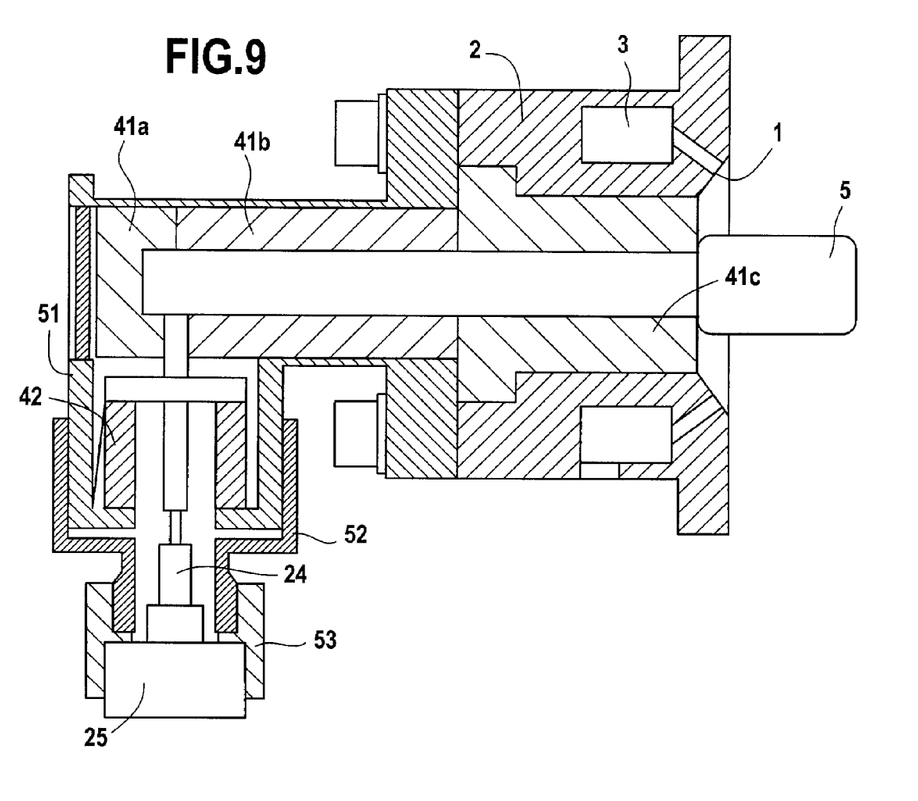
FIG. 9 is a diagrammatic axial section view of a variant embodiment of an electrolytic ignition head of the invention with an angled hermetically-sealed outlet.

FIG. 9 shows an electrical insulator made up of a plurality of portions so as to present minimum bulk.

As shown in FIG. 9, the downstream portion of the insulator is itself subdivided into two or three portions 41a, 41b, and 41c. The upstream portion 42 of the insulator is made so as to present a bend. It may be installed and held in place by a metal shutter 51 that is screw-fastened or welded to the rear portion of the injector 2.

The electrical power supply cable 24 for the central electrode 5 may be connected to a coaxial cable 25 by a coupling element 53 associated with a socket 52 fitted on the metal shutter 51.

The embodiments of FIGS. 8 and 9 serve to minimize the electromagnetic interference caused by the discharge current.

Figure 10:
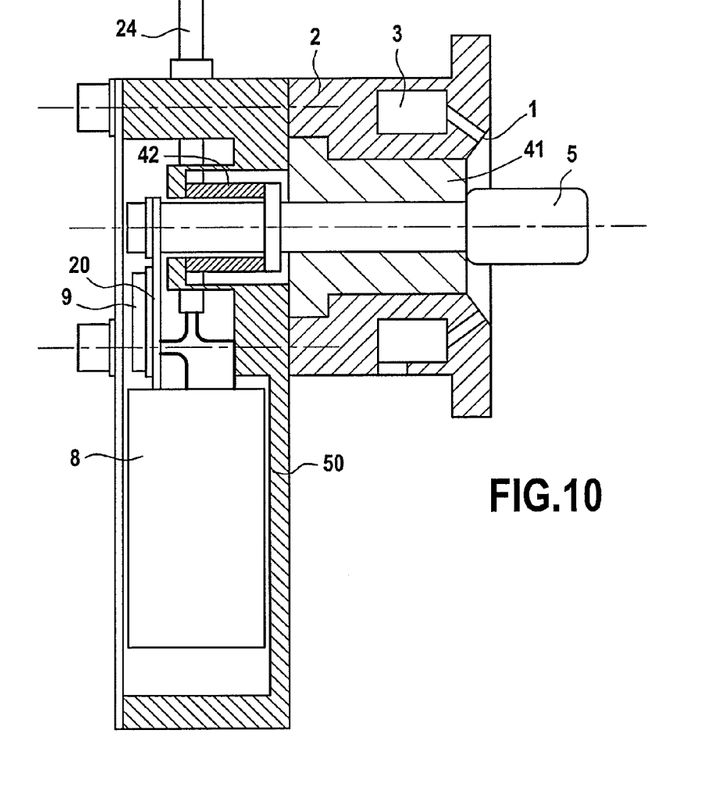
FIG. 10 is a diagrammatic axial section view of a variant embodiment of an electrolytic ignition head with an incorporated electrical power supply circuit.

FIG. 10 shows an example of an electrolytic ignitor with a power circuit incorporated in a housing 50 fitted to the body of the injector 2. The electrical insulator may be made of two portions 41 and 42 as in the embodiment of FIG. 7.

The capacitor 8 and the power transistor 9 forming the switch are incorporated in the housing 50.

The connection 20 with the central electrode 5 may be implemented in the form of a printed circuit supporting the power transistor 9. The electrical connections are thus constituted by no more than low-power cables 24 that are light in weight and that can accommodate small radii of curvature.

In the various embodiments described, the central electrode 5 may be made of a refractory metal of the tungsten or tungsten/rhenium type.

The invention claimed is:

1. A mono-propellant rocket engine comprising:
a main combustion chamber, an electrolytic ignitor, and a main injector, the electrolytic ignitor comprising an injector constituting a first electrode and including a first mono-propellant injector device for injecting a first liquid mono-propellant that is electrically conductive, a second electrode that is electrically insulated from the injector by an insulator, a tank for said first mono-propellant, a solenoid valve interposed between said tank and a distribution channel serving to dispense the first mono-propellant in said first mono-propellant injector device constituted by at least one injection hole opening out in a vicinity of the second electrode, and an electrical power supply circuit, the main injector being situated in the vicinity of the second electrode to inject jets of a second liquid mono-propellant into the main combustion chamber of the rocket engine, wherein the second electrode extends downstream beyond the injector, wherein the first liquid mono-propellant is injected via said at least one injection hole in a form of a free jet that strikes the second electrode in a zone situated outside a body of the injector, and wherein the electrical power supply circuit is adapted to raise the second electrode to a potential lying in a range of 50 volts to 1000 volts relative to a potential of the first electrode, in such a manner that a dissipation of electrical power by ionic conduction in the free jet of the first mono-propellant injected via said at least one injection hole is capable of causing temperature to rise sufficiently to lead to spontaneous decomposition of the first mono-propellant and to a production of combustion gas for ensuring ignition of the jets of the second mono-propellant coming from the main injector.

2. A rocket engine according to claim 1, wherein the dissipation of electrical power by ionic conduction in the free jet of the first mono-propellant injected via the at least one injection hole lies in a range of 100 to 1000 Watts per gram per second, and is capable of causing a temperature rise of 5000 to 20,000 degrees Celsius per second.

3. A rocket engine according to claim 1, wherein the second electrode is disposed centrally, and wherein a plurality of injection holes including the at least one injection hole for the first mono-propellant and outlets from the main injector are disposed around the central electrode.

4. A rocket engine according to claim 1, wherein the first mono-propellant injector device for injecting the first mono-propellant includes an annular channel.

5. A rocket engine according to claim 1, wherein the second electrode is made of a refractory metal comprising tungsten or tungsten/rhenium.

6. A rocket engine according to claim 1, wherein the first mono-propellant present in the tank is constituted by a same composition as the second mono-propellant delivered by the injector device for injecting the second mono-propellant.

7. A rocket engine according to claim 1, wherein the first mono-propellant comprises an aqueous solution of nitrate and a water-soluble fuel.

8. A rocket engine according to claim 7, wherein the aqueous solution of nitrate comprises hydroxylammonium nitrate, ammonium di-nitramide, or hydrazinium nitro-formate.

9. A rocket engine according to claim 7, wherein the water-soluble fuel comprises an alcohol or triethanolammonium nitrate.

10. A rocket engine according to claim 1, wherein the electrical power supply circuit comprises a DC power supply, at least one capacitor, and a switch, and wherein the injector constituting the first electrode presents a potential close to electrical ground.

11. A rocket engine according to claim 10, wherein the switch comprises a power transistor or a thyristor.

12. A rocket engine according to claim 10, wherein the capacitor and the switch are housed in a housing secured to the body of the electrolytic ignitor.

13. A rocket engine according to claim 1, wherein the electrical power supply circuit comprises a DC power source, at least one capacitor, a chopper circuit, and a voltage-raising transformer including a primary winding and a secondary winding being electrically isolated from each other, the primary winding being connected to the chopper circuit and the secondary winding being connected between the second electrode and the injector constituting the first electrode.

14. A rocket engine according to claim 1, wherein the insulator comprises a first insulator portion mounted to be able to expand freely, and a second insulator portion providing sealing between the second electrode and an insulator support.

15. A rocket engine according to claim 14, wherein the first insulator portion comprises at least one ceramic block made of boron nitride or of alumina.

16. A rocket engine according to claim 14, wherein the second insulator portion is made of alumina and is brazed firstly to the second electrode and secondly to the insulator support.

17. A rocket engine according to claim 14, wherein the second insulator portion is made of a flexible material comprising one of polytetrafluoroethylene, polytrifluorochloroethylene, Vespel, and fiberglass-filled polytetrafluoroethylene.

18. A rocket engine according to claim 14, wherein the second insulator portion is combined with a coaxial cable socket receiving a connector for a coaxial cable.

19. A rocket engine according to claim 1, wherein the electrical power supply circuit is adapted to raise the second electrode to a potential lying in the range 100 volts to 500 volts relative to the potential of the first electrode constituted by the injector.

20. A rocket engine according to claim 1, wherein:
the dissipation of electrical power by ionic conduction in the free jet of the first mono-propellant injected via the at least one injection hole lies in a range of 100 to 1000 Watts per gram per second, and is capable of causing a temperature rise of 5000 to 20,000 degrees Celsius per second;
the second electrode is disposed centrally, and a plurality of injection holes including the at least one injection hole for the first mono-propellant and outlets from the main injector are disposed around the central electrode;
the second electrode is made of a refractory metal comprising tungsten or tungsten/rhenium;
the first mono-propellant present in the tank is constituted by a same composition as the second mono-propellant delivered by the injector device for injecting the second mono-propellant
the first mono-propellant comprises an aqueous solution of nitrate and a water-soluble fuel;
the aqueous solution of nitrate comprises hydroxylammonium nitrate, ammonium di-nitramide, or hydrazinium nitro-formate;
the water-soluble fuel comprises an alcohol or triethanolammonium nitrate;
the insulator comprises a first insulator portion mounted to be able to expand freely, and a second insulator portion providing sealing between the second electrode and an insulator support;
the first insulator portion comprises at least one ceramic block made of boron nitride or of alumina; and
the electrical power supply circuit is adapted to raise the second electrode to a potential lying in the range 100 volts to 500 volts relative to the potential of the first electrode constituted by the injector.

21. A rocket engine according to claim 20, wherein:
the electrical power supply circuit comprises a DC power supply, at least one capacitor, and a switch, and the injector constituting the first electrode presents a potential close to electrical ground;
the switch comprises a power transistor or a thyristor; and
the capacitor and the switch are housed in a housing secured to the body of the ignitor.

22. A rocket engine according to claim 20, wherein the electrical power supply circuit comprises a DC power source, at least one capacitor, a chopper circuit, and a voltage-raising transformer including a primary winding and a secondary winding being electrically isolated from each other, the primary winding being connected to the chopper circuit and the secondary winding being connected between the second electrode and the injector constituting the first electrode.

23. A rocket engine according to claim 20, wherein the second insulator portion is made of alumina and is brazed firstly to the second electrode and secondly to the insulator support.

24. A rocket engine according to claim 20, wherein the second insulator portion is made of a flexible material comprising one of polytetrafluoroethylene, polytrifluorochloroethylene, Vespel, and fiberglass-filled polytetrafluoroethylene.

25. A rocket engine according to claim 20, wherein the second insulator portion is combined with a coaxial cable socket receiving a connector for a coaxial cable.

26. A rocket engine according to claim 20, wherein the first mono-propellant injector device includes an annular channel.

* * * * *

UNITED STATES PATENT AND TRADEMARK OFFICE
CERTIFICATE OF CORRECTION

PATENT NO. : 8,387,359 B2
APPLICATION NO. : 12/593727
DATED : March 5, 2013
INVENTOR(S) : Dominique Valentian Page 1 of 1

It is certified that error appears in the above-identified patent and that said Letters Patent is hereby corrected as shown below:

In the Specification

Column 2, line 36, "(is)" should read -- (µs) --; and

Column 7, line 3, "(TERN)" should read -- (TEAN) --.

Signed and Sealed this
Twenty-sixth Day of November, 2013

Margaret A. Focarino
*Commissioner for Patents of the United States Patent and Trademark Office*